March 24, 1970 H. W. DEMLER, SR., ET AL 3,502,355
PIPE, HOSE OR TUBE FLUID CONNECTION DEVICE
Original Filed April 13, 1967 3 Sheets-Sheet 1

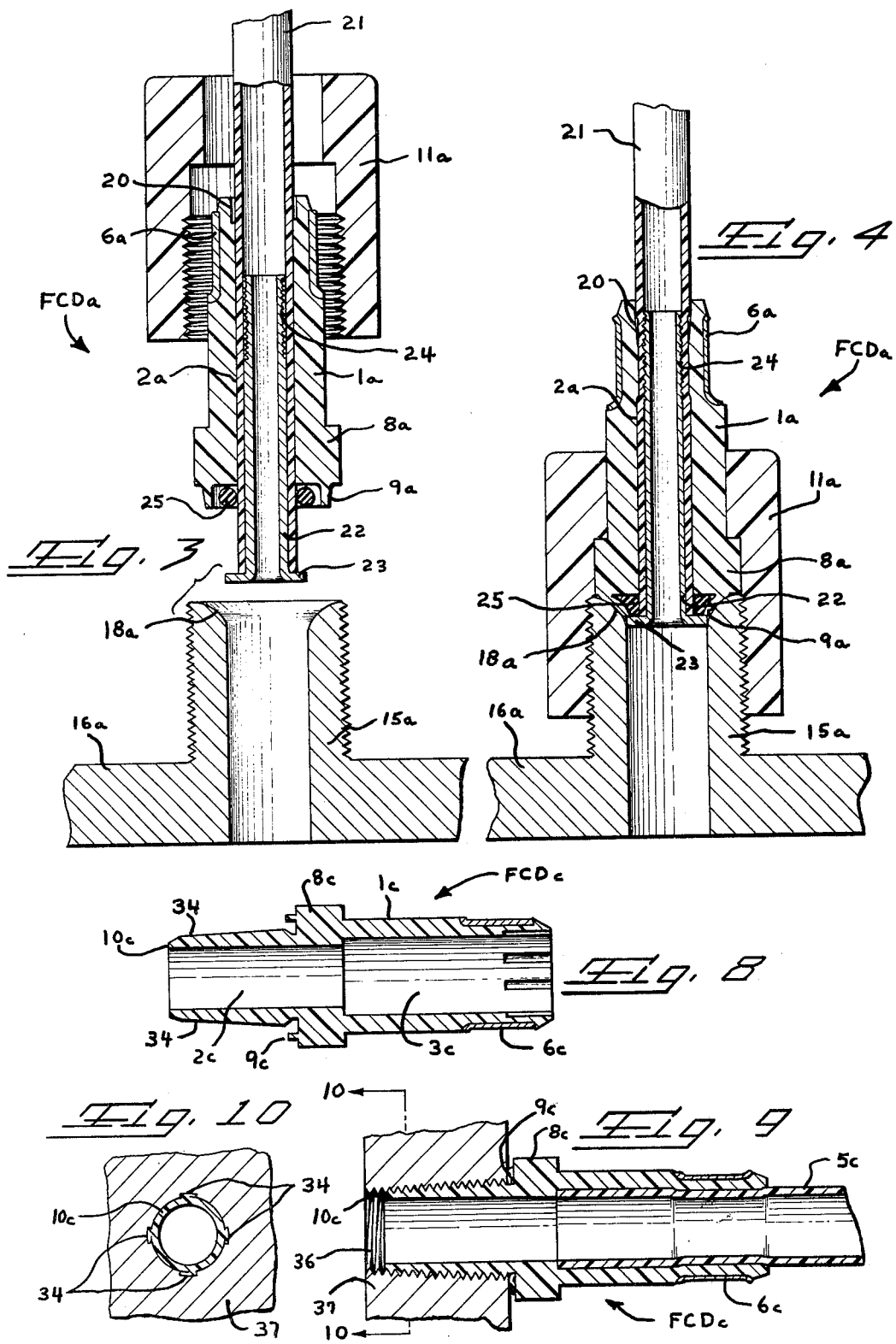

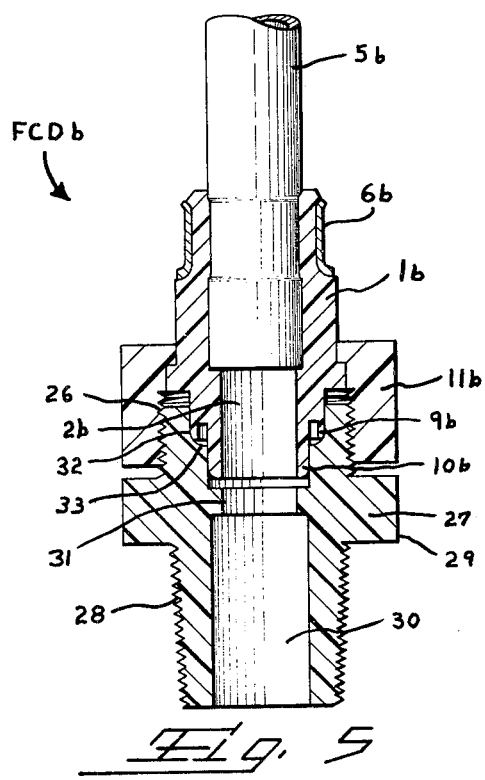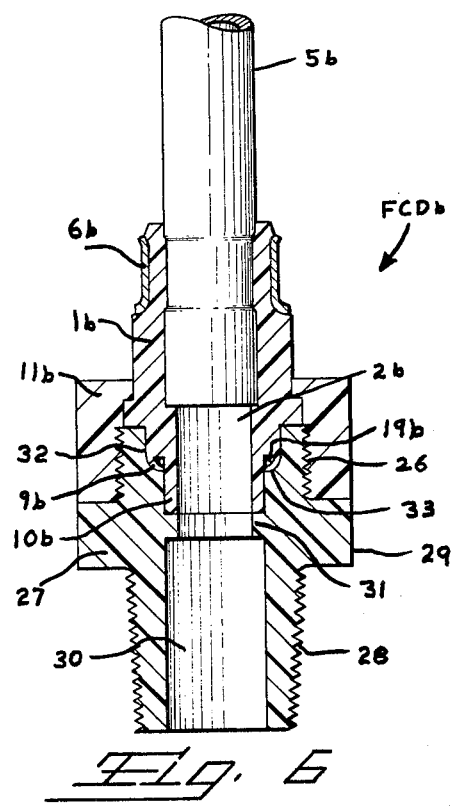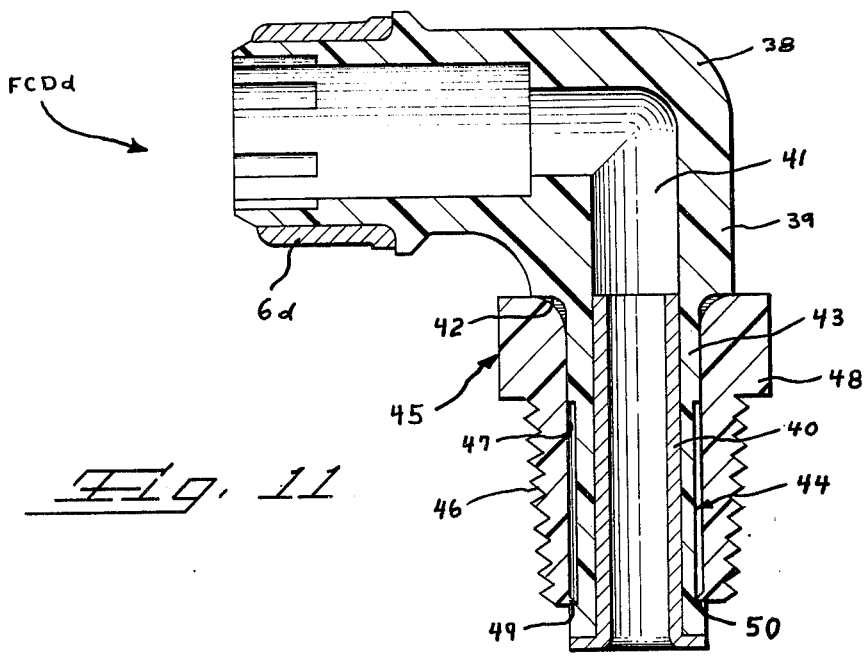

United States Patent Office 3,502,355
Patented Mar. 24, 1970

3,502,355
PIPE, HOSE OR TUBE FLUID CONNECTION DEVICE
Henry William Demler, Sr., Lebanon, and William Sewell Watts, Harrisburg, Pa., assignors to AMP Incorporated, Harrisburg, Pa.
Continuation of application Ser. No. 630,744, Apr. 13, 1967. This application Apr. 3, 1969, Ser. No. 817,239
Int. Cl. F16l *15/00, 41/00*
U.S. Cl. 285—110                                    5 Claims

ABSTRACT OF THE DISCLOSURE

A pipe, hose or tube fluid connection device having a body member provided with an opening extending therethrough, a sleeve member having one end securable to a pipe, hose or tube and the other end mateable with the body member, the other end of the sleeve member having a flexible flange engageable with the body member to provide a seal, and means for securing the sleeve member and body member together.

---

Figures 1, 2:
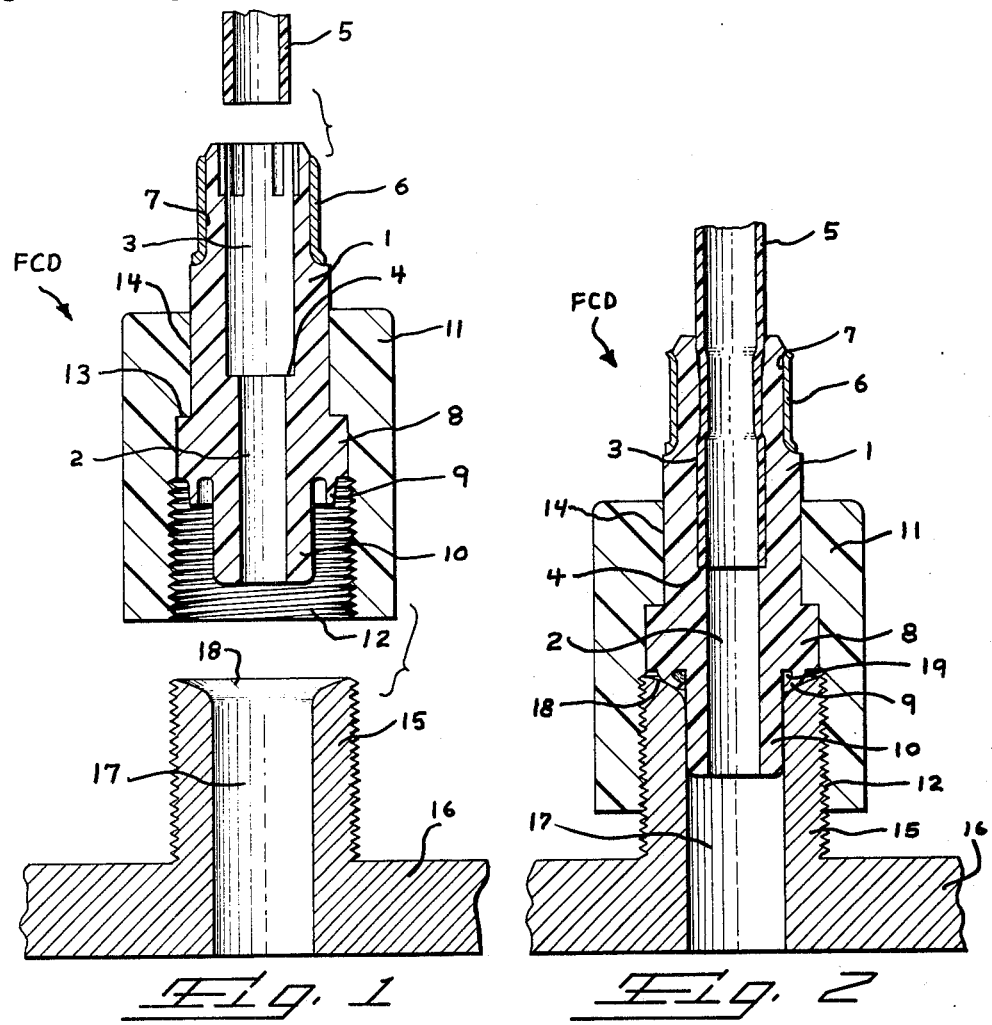

This application is a continuation of application Ser. No. 630,744 filed Apr. 13, 1967 and now abandoned.

This invention relates to fluid connection devices and more particularly to fluid connection devices for connecting a pipe, hose or tube to a body member in a sealed condition.

Fluid connection devices similar to the present invention are known in the prior art as exemplified in U.S. Patents 3,069,187 and 3,191,973. These patents, however, have certain drawbacks. One drawback is the small amount of contact between the sealing members. Another drawback is the selection of materials to form the sealing surfaces. A further drawback is the limited connection to metal tubes. An additional drawback is the connection to metal tubes by brazing which anneals the flexible sealing member thereby rendering it less flexible and shortening its life expectancy.

The foregoing and other drawbacks are overcome by the present invention whereby greater sealing is effected between sealing surfaces, by providing greater area contact therebetween; the selection of material to form the sealing surfaces is not relegated to a limited material; connection can be made to tubes of various materials, e.g., hard or soft metal or hard or soft plastic; no heating is necessary to connect to a tube thereby decreasing the flexibility of the flexible sealing member.

An object of the invention is to provide a fluid connection device that has an integral stiffly flexible sealing lip that provides large area of sealing contact.

Another object of the invention is the provision of a fluid connection device that is securable to soft or hard metal or soft or hard plastic tubes.

A further object of the invention is to provide a fluid connection device that is capable of providing a seal at or during extreme temperature variation.

An additional object of the invention is the provision of a fluid connection device that is readily and economically manufactured and is mateable with existing parts of connection devices.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

According to the invention, a fluid connection device is provided for connecting an end of a tubular means to an opening of a body member. The device comprises a one-piece sleeve member having means for sealingly securing the end of the tubular means therein. A section of the sleeve member is provided with a stiffly-flexible annular lip means and a cylindrical portion extending outwardly from the section in the same direction as the lip means but being inwardly from and concentric with respect to the lip means. The cylindrical portion slidably and snugly fits within the opening. Means is provided for engagement with the body member for maintaining the sleeve member on the body member and causing the lip means to be bent inwardly toward the cylindrical portion thereby forming a pocket by the lip means, the cylindrical portion and an end portion of the body member whereby fluid pressure, when in the pocket, aids in maintaining the lip means in sealing engagement with the end portion of the body member.

Figure 7:
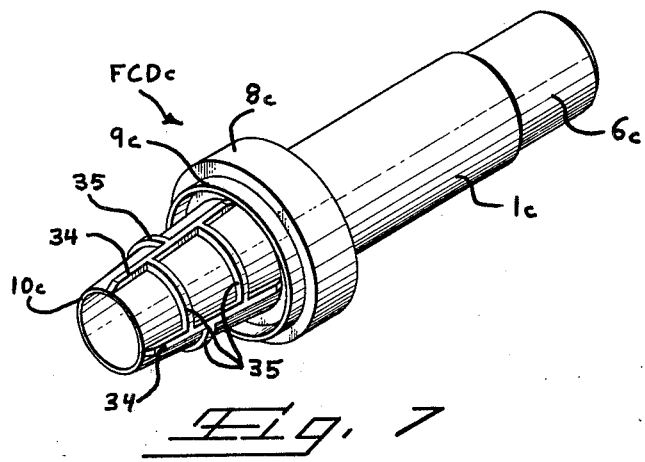

In the drawings:
FIGURE 1 is a cross-sectional and exploded view of fluid connection device;
FIGURE 2 is a view similar to FIGURE 1 with the fluid connection device in an assembled condition;
FIGURE 3 is a cross-sectional view of an alternative embodiment of the fluid connection device in an unsealed condition;
FIGURE 4 is a view similar to FIGURE 3 with the fluid connection device in a sealed condition;
FIGURE 5 is an exploded cross-sectional view of a further embodiment of the fluid connection device;
FIGURE 6 is a view similar to FIGURE 5 with the elements of the fluid connection device in an assembled condition;
FIGURE 7 is a perspective view of an additional embodiment of the fluid connection device;
FIGURE 8 is a longitudinal cross-sectional view of FIGURE 7;
FIGURE 9 is a view similar to FIGURE 8 in position in a threaded opening and connected to a tubular member;
FIGURE 10 is a cross-sectional view taken along lines 10—10 of FIGURE 9; and
FIGURE 11 is a cross-sectional view of a still further embodiment of the fluid connection device.

Turning now the drawings and more particularly FIGURES 1 and 2, a fluid connection device FCD comprises a sleeve member 1 provided with a bore 2 extending therethrough. Bore 2 includes a larger diameter section 3, interface 4 being formed between larger section 3 and the smaller section of bore 2. Section 3 of bore 2 receives tubular member 5 therein which abuts against interface 4 to limit the movement of tubular member 5 within bore 2.

A ferrule member 6 is disposed on necked-down section 7 of sleeve member 1. The part of section 3 underlying ferrule member 6 has a configuration of the type disclosed in U.S. patent application, Ser. No. 517,747, filed Dec. 30, 1965, now Patent No. 3,378,282 and sleeve member 1 is crimped onto tubular member 5 by ferrule member 6 to provide a sealed connection in accordance with the teaching of this copending application and as a preferred connection between sleeve member 1 and tubular member 5. Tubular member 5 can take various forms such as metal, plastic combination thereof or the like.

A flange member 8 is located on sleeve member 1 and includes a stiffly-flexible annular lip 9 concentric with an annular section 10 extending outwardly from flange member 8. Annular lip 9 is tapered in cross-section and is sufficiently thin to be flexible to the extent of performing a sealing function as will be explained hereinbelow. A nut 11 has a threaded opening 12 in which flange member 8 and annular section 10 are disposed and opening 12 terminates at a shoulder 13 for engagement with flange member 8. An opening 14 is disposed in nut 11 in communication with opening 12 through which the remainder of sleeve member 1 extends.

Threaded opening 12 of nut 11 is mateable with a threaded nipple 15 of body member 16. Threaded nipple 15 has an opening 17 extending therethrough which is provided with a convex entrance 18. Body member 16 may be a source of fluid supply or tubular member 5 may be connected to a source of fluid supply.

In assembly, nut 11 is positioned on sleeve member 1 and sleeve member 1 is crimped onto tubular member 5 by means of ferrule member 6 after tubular member 5 has been positioned within section 3 of bore 2. Nut 11 is threadably engaged with threaded nipple 15 with annular section 10 being mateable with opening 17 so that bore 2 and opening 17 are in communication and stiffly-flexible annular lip 9 in engagement with entrance 18 is bent inwardly toward annular section 10 to form a pocket 19 as nut 11 is tightened on threaded nipple 15, as illustrated in FIGURE 2, thereby providing a sealed connection and the pressure of the fluid within pocket 19 aids in maintaining annular lip 9 in engagement with convex entrance 18. Lip 9 is moldable to the configuration of entrance 18 and thereby provides a substantial area of contact therebetween.

The fluid connection device as illustrated in FIGURES 1 and 2 is operative under moderate pressure with minimum temperature variations. In the event that high pressure is to be used under extreme temperature variation, an O-ring can be disposed between annular lip 9 and annular section 10 which provides a sealed connection in such an environment.

FIGURES 3 and 4 illustrate fluid connection device FCDa which is an embodiment of the fluid connection device of FIGURES 1 and 2. Fluid connection device FCDa includes the sleeve member 1a which is similar to the sleeve member 1 except that no annular section extends outwardly from flange member 8a concentric with respect with stiffly-flexible annular lip 9a and a bore 2a has the same diameter through sleeve member 1a except for splined area 20 at the outer end of sleeve member 1a underlying ferrule member 6a. Nut 11a is similar to nut 11 of FIGURES 1 and 2.

Fluid connection device FCDa is principally used in conjunction with flexible plastic or soft metal tubing 21 in a varying temperature environment. Pliable tubing 21 is inserted in bore 2a of sleeve member 1a and hollow insert 22 having flange 23 is inserted within tubing 21. Insert 22 has a length substantially equal to the length of sleeve member 1a and is provided with a serrated section 24 on the exterior surface of insert 22 along the crimping area of sleeve member 1a. An O-ring 25 is disposed within annular lip 9 around tubing 21 and is maintained therein by flange 23.

In assembly, nut 11a and sleeve member 1a are placed on tubing 21, O-ring 25 is placed on tubing 21 and insert 22 is inserted within tubing 21 until flange 23 abuts the end thereof. Sleeve member 1a is moved along tubing 21 until flange 23 abuts O-ring 25 whereupon crimping pressure is applied to ferrule member 6a causing the interior surface of tubing 21 along serrated section 24 to be extruded thereinto, crimped ferrule member 6a securing sleeve member 1a onto tubing 21. Insert 22 provides backup pressure during the crimping operation, serrated section 24 provides increased tensile and splined area 20 provides antitorque characteristics.

Nut 11a is threadably mated with threaded nipple 15a on body member 16 and convex entrance 18a causes stiffly-flexible annular lip 9a to be bent inwardly against O-ring 25 thereby effecting an excellent seal due to the flexible characteristic of annular lip 9a, compressive pressure of O-ring 25 and the pressure of the fluid. Insert 22 prevents the pressure created by lip 9a onto O-ring 25 when lip 9a is moved inwardly upon engagement with entrance 18a to collapse tubing 21 at this location, and flange 23 permits O-ring 25 to perform its sealing and provision of pressure against annular lip 9a causing it to moldably conform to the configuration of entrance 18a. In some applications, O-ring 25 may be eliminated and annular lip 9a in moldable engagement with convex entrance 18a thereby providing an effective seal.

FIGURES 5 and 6 illustrate another embodiment of the fluid connection device, and, in this embodiment, fluid connection device FCDb illustrates sleeve member 1b and nut 11b similar to those illustrated in the FIGURES 1 and 2 with sleeve member 1b crimpably secured onto tubular member 5b via ferrule member 6b as heretofore described. Nut 11b is threadably mounted on threaded section 26 of male coupling or body member 27 which also includes tapered threaded section 28 for mateable engagement with tapered threads in a body member (not shown) but such as illustrated in FIGURE 9. Coupling member 27 includes a flange 29 having a polygonal periphery for engagement by wrench means to tighten member 27 in the tapered threaded hole of the body member and which separates threaded sections 26 and 28. A bore 30 extends through member 27 and an annular shoulder 31 is located within bore 30 and serves as an abutment against which annular section 10b engages when sleeve member 1b is inserted in bore 30. Bore 30 includes an enlarged section 32 which is provided with a concave area 33.

When nut 11b is threadably mounted on threaded section 26 of male coupling member 27 and tightened thereon, lip 9b is moldably and sealingly engaged with concave area 33 causing annular lip 9b to be curved inwardly toward annular section 9b thereby causing a pocket 19b to be formed and bore 2b to be in communication with bore 30. The engagement of stiffly-flexible annular lip 9b with concave area 33 and the pressure of the fluid provides an effective seal for low pressure applications. In the event high pressure applications are necessary, an O-ring may be inserted between annular lip 9b and annular section 10b as described hereinbefore.

Coupling member 27 could be formed so that section 28 would be like the crimpable end of sleeve member 1b thereby forming a connection device to splice tubular members together.

FIGURES 7 through 10 illustrate an additional embodiment of the fluid connection device and this fluid connection device FCDc which includes a sleeve member 1c similar to sleeve member 1 of FIGURES 1 and 2 and sleeve member 1b of FIGURES 5 and 6 except that annular section 10c extending outwardly from flange member 8c is tapered and has longitudinal ribs 34 extending along the exterior surface of tapered annular section 10c. Arcuate ribs 35 are disposed on the exterior surface of section 10c between ribs 34 in a staggered relationship.

In assembly, tubular member 5c is inserted in section 3c of bore 2c and ferrule member 6c is subjected to a crimping operation to secure the fluid connection device thereto. A tool of the type illustrated in FIGURES 9 and 10 of U.S. patent application Ser. No. 571,546, filed Aug. 10, 1966, may be used to engage flange member 8c to drive section 10c of the fluid connection device into a tapered threaded aperture 36 in body member 37. The action of driving section 10c within threaded aperture 36 causes longitudinal ribs 34 to be bent over and taking a form corresponding with the threads of aperture 36 which also applies with respect to ribs 35 thereby securing the fluid connection device in position and providing a tortuous path for the fluid to try to escape. Sealing is effected by stiffly-flexible annular lip 9c being bent inwardly into moldable engagement with body member 37 adjacent the entrance to aperture 36 as illustrated in FIGURE 9, and if desired, an O-ring may be disposed between annular lip 9c and section 10c as described heretofore.

FIGURE 11 is a still further embodiment of the fluid connection device which illustrates fluid connection device FCDd comprising sleeve member 38 in the form of an elbow and provided with a crimpable end via ferrule member 6d onto an end of a tubular member as heretofore explained. Sleeve member 38 also includes section 39 having a hollow insert 40 disposed in bore 41 which extends through sleeve member 38. Section 39 is provided with a bearing surface 42 and tubular section 43 of less diameter than section 39 and in which insert 40 is located. An annular recess 44 is provided in tubular section 43.

Male coupling member 45 has a threaded section 46 for mateable engagement with a tapered threaded opening of a body member and has a bore 47 in which tubular section 43 is disposed. Flange 48 having a polygonal periphery is located at one end of coupling member 45 and it abuts against bearing surface 42. A lip 49 is disposed on the surface of bore 47 at the entrance thereto and engages outer wall 50 of recess 44 to maintain coupling member 45 on tubular section 43 when the fluid connection device is not in position in a threaded opening.

In operation, sleeve member 38 is crimped onto a tubular member via ferrule member 6d and coupling member 45 is threadably tightened in a threaded opening. The tightening of threaded section 46 of the coupling member within the tapered threaded opening causes bore 47 to move inwardly into snug and sealing engagement within recess 44 thereby forming a sealed connection. Insert 40 provides backup to prevent collapsing of tubular section 43 thereby effecting the seal. After the sealed connection has been obtained, sleeve member 38 can be rotated relative to coupling member 45 without disturbing the seal. Sleeve member 38 can take other forms such as, for example, a T-shape or a straight sleeve or the like.

The fluid connection devices described hereinabove are preferably molded in accordance with conventional molding techniques from a suitable plastic material having the desirable features to provide the annular sealing lip with stiffly-flexible characteristics to accomplish the intended purpose. The ferrule members are metal. Depending upon the type of tubing to be used, an insert such as insert 22 may be used in the tubing when being secured to the sleeve members in FIGURES 1, 2 and 5–11.

It will therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A fluid connection device for connection to tubular means comprising a body member having a radially inwardly extending end-engaging section and an opening extending through said body member, a one-piece sleeve member having the physical properties of plastic material and having a bore extending therethrough in which an end of the tubular means is to be disposed, means provided by said sleeve member for sealingly securing the end of the tubular means in said bore, a section of said sleeve member having stiffly-flexible annular lip means extending substantially parallel with an axis of said bore whereby said annular lip means provides a large area of sealing contact with said body member, a cylindrical portion extending outwardly from said section in the same direction as said annular lip means but being inwardly from and concentric with respect to said lip means, said cylindrical portion having a length substantially greater than said lip means and being slidably disposed in said opening in said body member to position said lip means in a central manner with respect to the end-engaging section, said cylindrical portion having an outer diameter substantially equal to said opening, and means provided by said body member and said sleeve member maintaining said sleeve member on said body member with said annular lip means in engagement with said end-engaging section whereby said annular lip means is bent inwardly toward said axis thereby forming a pocket by said annular lip means, said cylindrical portion and said end-engaging section whereby fluid pressure, when in said pocket, aids in maintaining said annular lip means in sealing engagement with said end-engaging section.

2. A fluid connection device according to claim 1 wherein said maintaining means comprises a threaded nut.

3. A fluid connection device according to claim 1 wherein said end-engaging section has a convex configuration.

4. A fluid connection device according to claim 1 wherein said end-engaging section has a concave configuration.

5. A fluid connection device for connection to tubular means comprising a body member having a radially inwardly extending end-engaging section and an opening extending through said body member, a one-piece sleeve member having a bore extending therethrough in which an end of the tubular means is to be disposed, means provided by said sleeve member for sealingly securing the end of the tubular means in said bore, a section of said sleeve member having stiffly-flexible annular lip means extending substantially parallel with an axis of said bore whereby said annular lip means provides a large area of sealing contact with said body member, a cylindrical portion extending outwardly from said section in the same direction as said annular lip means but being inwardly from and concentric with respect to said lip means, said cylindrical portion having a length substantially greater than said lip means and being disposed in said opening in said body member to position said lip means in a central manner with respect to the end-engaging section, said cylindrical portion having an outer diameter substantially equal to said opening, and means provided by said body member and said sleeve member maintaining said sleeve member on said body member with said annular lip means in engagement with said end-engaging section whereby said annular lip means is bent inwardly toward said axis thereby forming a pocket by said annular lip means, said cylindrical portion and said end-engaging section whereby fluid pressure, when in said pocket, aids in maintaining said annular lip means in sealing engagement with said end-engaging section.

References Cited

UNITED STATES PATENTS

| 2,746,486 | 5/1956 | Gratzmuller. |
| 3,003,795 | 10/1961 | Lyon. |
| 3,069,187 | 12/1962 | Collins et al. |
| 3,101,206 | 8/1963 | Frank. |
| 3,104,899 | 9/1963 | McKenzie. |
| 3,264,012 | 8/1966 | Giovanazzi et al. |
| 3,378,282 | 4/1968 | Demler. |

FOREIGN PATENTS

| 1,123,385 | 6/1956 | France. |
| 1,370,139 | 7/1964 | France. |

THOMAS F. CALLAGHAN, Primary Examiner

U.S. Cl. X.R.

285—158, 174, 177, 334.4